(12) United States Patent
Oberg et al.

(10) Patent No.: US 8,251,416 B1
(45) Date of Patent: Aug. 28, 2012

(54) FIREPLACE LOG HANDLING DEVICE

(75) Inventors: James D. Oberg, Eagle Bend, MN (US); Robert H. Lusty, Alexandria, MN (US)

(73) Assignee: BAC Industries, Inc., Minnetonka, MN (US)

( * ) Notice: Subject to any disclaimer, the term of this patent is extended or adjusted under 35 U.S.C. 154(b) by 0 days.

(21) Appl. No.: 13/197,236

(22) Filed: Aug. 3, 2011

(51) Int. Cl.
*B65G 7/12* (2006.01)

(52) U.S. Cl. .......................................... 294/16; 294/170

(58) Field of Classification Search ................ 294/9, 11, 294/13, 14, 19.3, 16, 26, 137, 170, 159; 43/6; 16/422, 425; 452/159
See application file for complete search history.

(56) References Cited

U.S. PATENT DOCUMENTS

| | | | | |
|---|---|---|---|---|
| 359,241 A * | 3/1887 | Case | | 217/125 |
| 378,503 A * | 2/1888 | Woodward | | 294/5 |
| 755,044 A * | 3/1904 | Rafield | | 294/16 |
| 1,413,358 A * | 4/1922 | Reed | | 294/106 |
| 1,460,730 A * | 7/1923 | Phelps | | 294/16 |
| 1,472,997 A * | 11/1923 | Stevenson | | 294/170 |
| 1,742,867 A * | 1/1930 | Levi | | 16/114.1 |
| 1,849,364 A * | 3/1932 | Clark | | 294/16 |
| 2,023,328 A * | 12/1935 | Lamp | | 294/16 |
| 2,025,160 A * | 12/1935 | Everett | | 294/16 |
| 2,198,244 A * | 4/1940 | Chapman | | 294/170 |
| 2,490,467 A * | 12/1949 | Payne | | 294/16 |
| 2,541,449 A * | 2/1951 | Vickers | | 294/149 |
| 2,594,387 A * | 4/1952 | Breuer | | 43/42.06 |
| 2,606,526 A * | 8/1952 | Lound | | 119/714 |
| 2,789,716 A * | 4/1957 | Wolf | | 414/741 |
| 2,789,858 A * | 4/1957 | Kughler | | 294/67.33 |
| 2,812,206 A * | 11/1957 | Brunn | | 452/192 |
| 2,944,713 A * | 7/1960 | Beach | | 294/153 |
| 3,414,909 A * | 12/1968 | Provi et al. | | 4/577.1 |
| 3,531,148 A * | 9/1970 | Rohde | | 294/26 |
| 3,619,852 A * | 11/1971 | Eckberg | | 16/425 |
| 3,899,205 A * | 8/1975 | Lanigan et al. | | 294/67.31 |
| 4,176,871 A | 12/1979 | Stover | | |
| 4,296,880 A | 10/1981 | Olshefsky | | |
| 4,477,113 A | 10/1984 | Lybolt | | |
| 4,699,416 A | 10/1987 | Lacey | | |
| 2008/0185063 A1* | 8/2008 | Bieszczad et al. | | 138/126 |
| 2011/0193360 A1 | 8/2011 | O'Donnell | | |
| 2011/0226826 A1 | 9/2011 | Owen | | |

* cited by examiner

*Primary Examiner* — Paul T Chin

(74) *Attorney, Agent, or Firm* — Nikolai & Mersereau, P.A; Thomas J. Nikolai

(57) ABSTRACT

A tool for picking up and carrying cut fireplace logs comprises a somewhat stiff but flexible handle approximately equal in length to the length of the firewood logs and that has hooks replaceably attached to opposed ends of the handle, the hooks having a pointed end arranged to penetrate into the end surfaces of a log when a lifting force is applied to the handle.

11 Claims, 2 Drawing Sheets

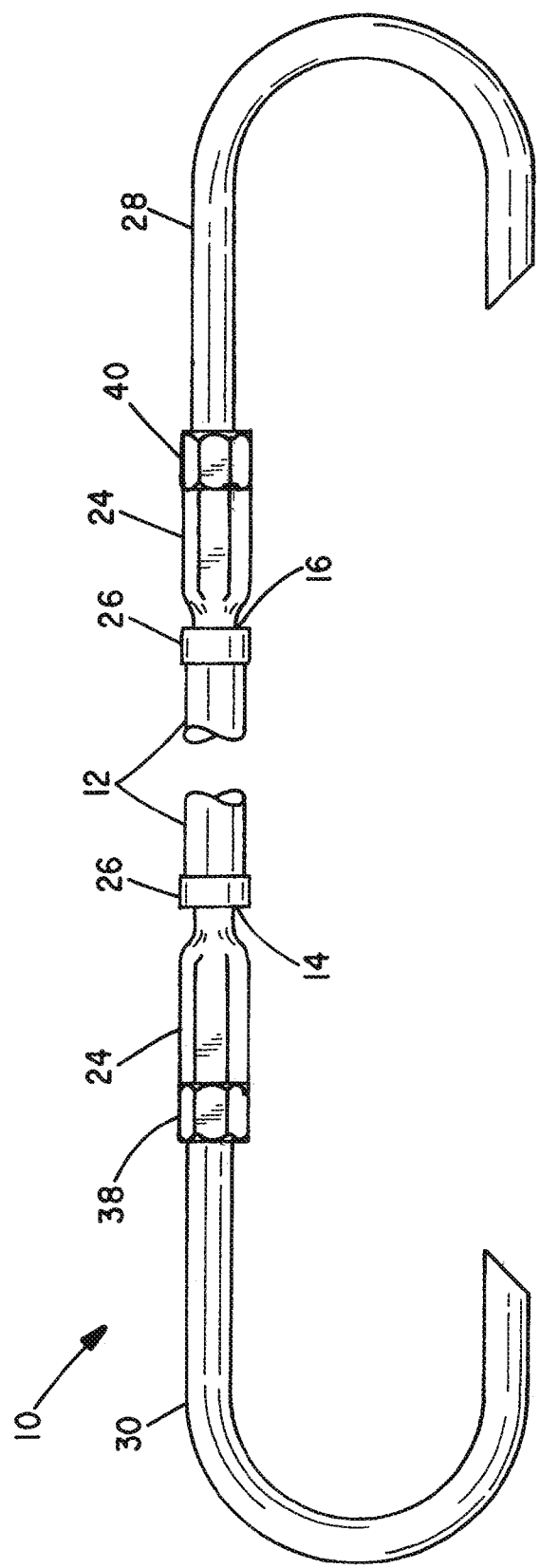
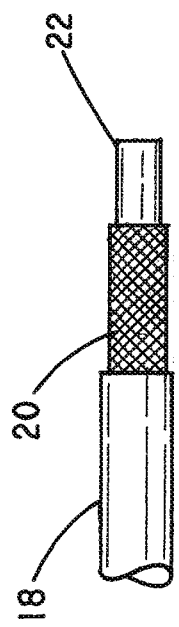
FIG. 1
FIG. 2

FIREPLACE LOG HANDLING DEVICE

FIELD OF THE INVENTION

This invention relates generally to material handling equipment, and more particularly to a hand tool for grasping, carrying and stacking logs cut and split for use in residential fireplaces.

DISCUSSION OF THE PRIOR ART

When trees are felled in a forest or woodlot to be used as firewood, the tree trunk and branches are sawed into lengths that will conveniently fit on a standard size fireplace grate and then allowed to dry. Once dry or seasoned, the logs of a certain size are split longitudinally, either by using a hydraulic log splitter or by using a splitting wedge and a maul.

Once split, the fireplace logs must be loaded onto the bed of a truck and transported to a customer's residence. When delivered to the customer, the logs must be stacked for later use. Firewood is usually sold by a unit called a face cord where the individual logs, when stacked in parallel, creates a stack measuring 8 ft. long×4 ft. high×16 in. deep.

Various tools have been used by woodlot owners to pick up, carry and stack cord wood. For example, iron tongs may be used to grasp logs that have been cut and split and then to carry them to a truck when loading, and to facilitate stacking when unloading the truck. Such tongs are fairly heavy, e.g., 10 or more pounds, and when added to the weight of the log being moved, can soon tire out the worker. Picking up logs by hand results in excessive stooping and lifting.

Thus, a need exists for a lightweight, easy-to-use tool for grasping, carrying and stacking fireplace logs. The present invention provides just such a tool.

SUMMARY OF THE INVENTION

In accordance with a preferred embodiment of this invention, there is provided a tool comprising a somewhat flexible, resilient handle member of a length approximately equal to a length of a cut fireplace log. The handle member has first and second ends. First and second rigid hooks, each including a threaded shank portion integrally joined to a U-shaped bend, are affixed to the first and second ends of the resilient handle member by means of a threaded coupler that is crimpled to the first and second ends of the resilient handle member and adapted to receive threads on the threaded shank portion of the hooks.

In accordance with a further embodiment of the invention, the handle may comprise wire braid reinforced rubber tubing of a type that is used in fabricating hydraulic hoses. Such material has been found to possess the desired degree of flexibility.

The overall length of the tool may be such that when the hooks are made to engage the opposed cut end surfaces of a log and a lifting force is applied to the resilient handle, the weight of the log causes pointed ends of the hooks to dig deeper into the wood, allowing a person to pick up the log and carry it to a site where it is to be released, such as onto the bed of a pickup truck or onto a stack being created.

DESCRIPTION OF THE DRAWINGS

The foregoing features, objects and advantages of the invention will become apparent to those skilled in the art from the following detailed description of a preferred embodiment, especially when considered in conjunction with the accompanying drawings in which like numerals in the several views refer to corresponding parts.

FIG. 1 is a side elevation view of the tool of the present invention;

FIG. 2 is a broken away view showing the internal construction of the handle member used in fabricating the tool of the present invention;

DESCRIPTION OF A PREFERRED EMBODIMENT

Figure 3:
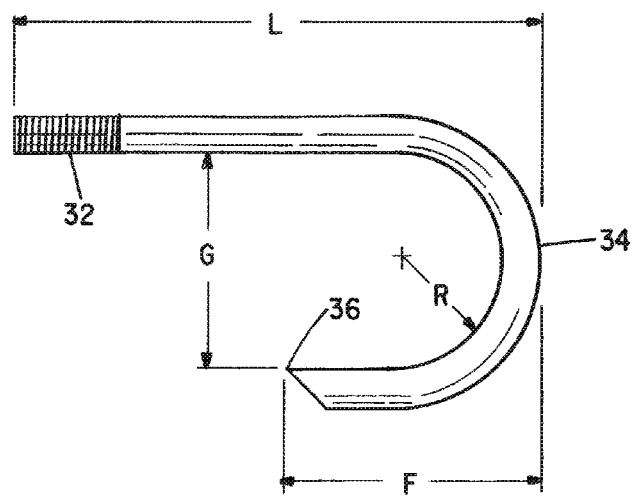
FIG. 3 is a detailed drawing showing the design of a hook to be used with the tool.

This description of the preferred embodiments is intended to be read in connection with the accompanying drawings, which are to be considered part of the entire written description of this invention. In the description, relative terms such as "lower", "upper", "horizontal", "vertical", "above", "below", "up", "down", "top" and "bottom" as well as derivatives thereof (e.g., "horizontally", "downwardly", "upwardly", etc.) should be construed to refer to the orientation as then described or as shown in the drawings under discussion. These relative terms are for convenience of description and do not require that the apparatus be constructed or operated in a particular orientation. Terms such as "connected", "connecting", "attached", "attaching", "join" and "joining" are used interchangeably and refer to one structure or surface being secured to another structure or surface or integrally fabricated in one piece, unless expressively described otherwise.

With reference first to FIG. 1, there is shown a side elevation view of the log handling device in accordance with a preferred embodiment of the present invention. The tool is indicated generally by numeral 10 and is seen to comprise an elongated somewhat flexible or resilient handle member 12 having first and second ends 14, 16. Without limitation, the handle member 12 is preferably cut to length from hydraulic hose stock and which, as shown in the fragmentary view of FIG. 2, comprises an outer rubber covering 18 in which is embedded a wire braid 20 surrounding an inner tubular core 22. The handle 12 is preferably about 16 inches in length when designed to be used with logs cut to face cord length.

Affixed to the opposed ends 14 and 16 of the handle member 12 are internally threaded couplers or sockets 24 having a hex-shaped cross section that are fixedly attached by crimp bands 26 that tightly compress the hose material onto stem portions of the threaded sockets 24 that have been inserted into the central lumen of the hose comprising the handle member 12.

The sockets 24 are internally threaded to accept external threads formed on the shanks of hook members 28 and 30. While a threaded connection is preferred, it is also contemplated that the hooks may be fastened to the sockets by other means, for example, by welding. As illustrated in FIG. 3, each of the hooks 28 and 30 comprises a shank portion of a length, L, having threads 32 at the end thereof. The shank portion is integrally joined to a bend 34 of a radius, R, and defining a gape, G, the hook having a front length, F. Without limitation, the hooks can be made out of 5/16 inch cold rolled steel or stainless steel round stock and excellent performance results have been achieved where the following dimensions for the hooks 30 have been used:

L=6¾ in.
R=1¼ in.
G=2½ in.
F=2½ in.

As also seen in FIG. 3, the bend 34 ends in a taper leading to a sharp point 36.

It has also been found convenient to include hex-shaped locknuts, as at 38 and 40, on the threaded end of the hook so that when the locknuts are tightened down against the sockets 24, they prevent rotation of the hooks relative to the handle 12.

Figure 4:
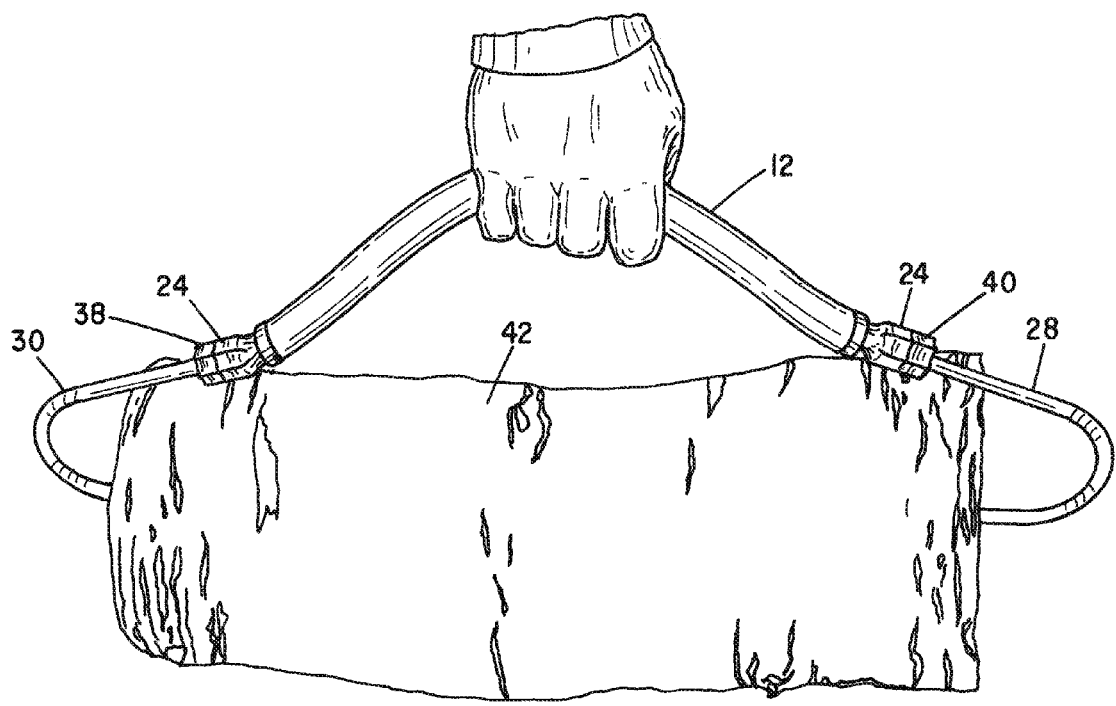
FIG. 4 is a perspective view of the tool of the present invention being used to grip a fireplace log.

Referring next to FIG. 4, the log handling tool of the present invention is illustrated as being used in lifting and carrying a log 42. In use, the tool is gripped in one hand and is lowered onto the leg so that the handle portion 12 is closely parallel to the length dimension of the log. Here, the hooks 28 and 30 just extend beyond the opposed ends of the log. The hydraulic hose material used for handle 12 possesses a desired degree of stiffness or rigidity yet remains sufficiently flexible so as to be generally rectilinear until a lifting force is applied, pulling hooks so as to draw them in against the log ends to dig the points 36 into the wood as the handle 12 is flexed into a curved profile as shown in FIG. 4. The log can then be carried much like one would carry a suitcase.

When logs are resting on the ground, the worker need only lean over to one side slightly to have the pointed ends of the hooks engage the log in the manner illustrated and then by standing upright, the log is lifted from the ground. The weight of the log as it is being elevated causes the pointed ends of the tool to more firmly grip the log ends so that it does not slip free of the tool.

When stacking logs or loading them onto the bed of a truck, the worker may impart a swinging motion to the log which allows the tool 10 to disengage from the log allowing it to sail through the air and land on the stack or on the truck bed. The use of the tool eliminates the need for the worker to repeatedly bend over at the waist and lift, thus minimizing the chances for a strained back when loading cut logs on a truck or during stacking operations.

Because of the manner in which the hooks 28 and 30 are fastened to the handle 12, the hooks may readily be removed for sharpening and later replaced.

This invention has been described herein in considerable detail in order to comply with the patent statutes and to provide those skilled in the art with the information needed to apply the novel principles and to construct and use such specialized components as are required. However, it is to be understood that the invention can be carried out by specifically different equipment and devices, and that various modifications, both as to the equipment and operating procedures, can be accomplished without departing from the scope of the invention itself.

What is claimed is:

1. A fireplace log handling apparatus comprising:
    (a) a resilient handle member of a length approximately equal to a length of fireplace logs where the handle member has first and second ends;
    (b) first and second rigid hook members, each including a threaded shank portion integrally joined to a U-shaped bend, said bend ending in a point; and
    (c) a threaded socket attached individually to each of the first and second ends of the handle member, said threaded sockets adapted to receive threads on the threaded shank portion of the first and second hook members therein.

2. The fireplace log handling apparatus of claim 1 wherein the resilient handle comprises wire braid reinforced rubber tubing of a predetermined length and a stiffness properly tending to maintain the handle rectilinear in the absence of a lifting force.

3. The fireplace log handling apparatus of claim 2 wherein the threaded sockets are affixed to the first and second ends by a crimp connection.

4. The fireplace log handling apparatus of claim 1 wherein the rigid hook members comprise a gape of about 2½ inches, a throat depth of about 1¼ inches and a front length of about 2½ inches.

5. The fireplace log handling apparatus of claim 4 wherein the threaded shank of the rigid hook member has a length of about 5½ inches and round cross-section of a diameter of 5/16 inch.

6. The fireplace log handling apparatus of claim 5 wherein the sockets are internally threaded to a depth of at least ⅜ inch with 5/16-18 threads.

7. The fireplace log handling apparatus of claim 1 and further including a jam nut disposed on the threads of the threaded shank portion of the hook members and cooperating with the sockets to prevent rotation of the hook member relative to the resilient handle member.

8. The fireplace log handling apparatus of claim 1 wherein the rigid hook members have tapered ends.

9. A fireplace log handling apparatus comprising:
    (a) a resilient handle member of a length approximately equal to a length of a fireplace log to be handled, said handle member having first and second ends;
    (b) first and second rigid hook members, each having a shank segment integrally joined to a generally U-shaped bend, said bend ending in a point; and
    (c) a pair of sockets attached individually to the first and second ends of the handle member and adapted to receive an end portion of the shank segment therein.

10. The fireplace log handling apparatus of claim 9 wherein the end portions of the shank segments of the first and second hooks are externally threaded and the sockets are internally threaded.

11. The fireplace log handling apparatus of claim 9 wherein the end portions of the shank segments of the first and second hooks are welded to the sockets.

* * * * *